(12) United States Patent
Yamazaki et al.

(10) Patent No.: US 9,679,685 B2
(45) Date of Patent: Jun. 13, 2017

(54) VOLTAGE NONLINEAR RESISTIVE ELEMENT AND METHOD FOR MANUFACTURING THE SAME

(71) Applicant: NGK Insulators, Ltd., Nagoya (JP)

(72) Inventors: Satoshi Yamazaki, Nagoya (JP); Toru Hayase, Nagoya (JP); Kenji Morimoto, Kasugai (JP); Shinji Kawasaki, Nagoya (JP); Yukihisa Takeuchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 124 days.

(21) Appl. No.: 14/662,669

(22) Filed: Mar. 19, 2015

(65) Prior Publication Data

US 2015/0270037 A1 Sep. 24, 2015

(30) Foreign Application Priority Data

Mar. 19, 2014 (JP) ................. 2014-056498

(51) Int. Cl.
*H01C 7/112* (2006.01)
*C04B 35/453* (2006.01)
(Continued)

(52) U.S. Cl.
CPC ............ *H01C 7/112* (2013.01); *C04B 35/453* (2013.01); *C04B 35/62695* (2013.01); *C04B 37/003* (2013.01); *C04B 37/005* (2013.01); *C04B 37/006* (2013.01); *H01C 7/10* (2013.01); *H01C 7/102* (2013.01); *H01C 7/18* (2013.01); *H01C 17/00* (2013.01); *C04B 2235/322* (2013.01); *C04B 2235/3217* (2013.01); *C04B 2235/3284* (2013.01); *C04B 2235/3286* (2013.01);
(Continued)

(58) Field of Classification Search
CPC ..................................................... H01C 7/112
See application file for complete search history.

(56) References Cited

U.S. PATENT DOCUMENTS 3,962,144 A 6/1976 Matsuura et al.
4,272,754 A * 6/1981 Lou ..................... H01C 7/1013
257/43

(Continued)

FOREIGN PATENT DOCUMENTS

GB  764693 A   1/1957
JP  4123957 B2  7/2008

OTHER PUBLICATIONS

U.S. Appl. No. 14/662,625, filed Mar. 19, 2015, Yamazaki, et al.
(Continued)

*Primary Examiner* — James Harvey
(74) *Attorney, Agent, or Firm* — Burr & Brown, PLLC (57) ABSTRACT

The voltage nonlinear resistive element includes a resistor containing a joined body in which a zinc oxide ceramic layer composed mainly of zinc oxide and having a volume resistivity of less than $1.0 \times 10^{-2}$ Ωcm is joined to a rare-earth metal oxide layer composed mainly of a rare-earth metal oxide, and a pair of electrodes disposed on the resistor such that an electrically conductive path passes through a junction between the zinc oxide ceramic layer and the rare-earth metal oxide layer. In this element, the zinc oxide ceramic layer of the joined body has a lower volume resistivity than before. This can result in a lower clamping voltage in a high electric current region than before.

7 Claims, 4 Drawing Sheets (51) Int. Cl.
*H01C 7/102* (2006.01)
*H01C 7/18* (2006.01)
*H01C 17/00* (2006.01)
*C04B 35/626* (2006.01)
*C04B 37/00* (2006.01)
*H01C 7/10* (2006.01)
*H01C 7/12* (2006.01)

(52) U.S. Cl.
CPC ..... *C04B 2235/443* (2013.01); *C04B 2235/5436* (2013.01); *C04B 2235/5454* (2013.01); *C04B 2235/658* (2013.01); *C04B 2235/96* (2013.01); *C04B 2237/06* (2013.01); *C04B 2237/066* (2013.01); *C04B 2237/125* (2013.01); *C04B 2237/126* (2013.01); *C04B 2237/34* (2013.01); *C04B 2237/708* (2013.01); *C04B 2237/72* (2013.01); *H01C 7/1006* (2013.01); *H01C 7/12* (2013.01); *Y10T 29/49082* (2015.01)

(56) References Cited

U.S. PATENT DOCUMENTS

| | | | |
|---|---|---|---|
| 4,296,002 A | 10/1981 | Sokoly et al. | |
| 4,383,237 A | 5/1983 | Eda et al. | |
| 4,400,683 A | 8/1983 | Eda et al. | |
| 5,753,176 A * | 5/1998 | Ushiro | C04B 35/6325 264/617 |
| 5,854,586 A * | 12/1998 | McMillan | H01C 7/112 252/519.51 |
| 6,279,811 B1 | 8/2001 | Ramarge et al. | |
| 7,994,893 B2 * | 8/2011 | Matsuoka | C04B 35/453 338/20 |
| 2004/0155750 A1 | 8/2004 | Nakamura | |
| 2005/0160587 A1 | 7/2005 | Ramarge et al. | |
| 2012/0128872 A1 * | 5/2012 | Doye | C23C 18/1208 427/160 |
| 2015/0270036 A1 * | 9/2015 | Yamazaki | H01C 7/10 338/20 |
| 2015/0270037 A1 * | 9/2015 | Yamazaki | H01C 7/10 338/20 |

OTHER PUBLICATIONS

European Search Report, European Application No. 15159822.4, dated Jan. 8, 2016 (7 pages).

Yu-Hsien Chou, et al., "Preparation and Characterization of Solid-State Sintered Aluminum-Doped Zinc Oxide with Different Alumina Contents," Bulletin of Materials Science, Springer India, New Delhi, vol. 34, No. 3, Sep. 2, 2011, pp. 477-482.

Partial European Search Report (Application No. 15159822.4) dated Sep. 17, 2015.

* cited by examiner

VOLTAGE NONLINEAR RESISTIVE ELEMENT AND METHOD FOR MANUFACTURING THE SAME

BACKGROUND OF THE INVENTION

1. Field of the Invention

The present invention relates to a voltage nonlinear resistive element and a method for manufacturing the voltage nonlinear resistive element.

2. Description of the Related Art

Voltage nonlinear resistive elements (varistors) are elements having a structure in which a voltage nonlinear resistor is disposed between a pair of electrodes, and are widely used as elements for protecting electronic circuits from abnormal voltage in various sensors, such as humidity sensors and temperature sensors. Patent Literature 1 discloses a voltage nonlinear resistive element of this type in which a resistor is disposed between a pair of electrodes, wherein the resistor has a structure in which a zinc oxide ceramic layer is joined to a metal oxide layer represented by $M_{1-x}A_xBO_3$ (M: rare-earth element, A: at least one of Sr and Ba, B: at least one of Mn and Co, $x \leq 0.4$). The resistor is produced by joining a green zinc oxide ceramic and a green metal oxide and sintering them as one body at a temperature in the range of 1200° C. to 1350° C. The zinc oxide ceramic layer has a specific resistance in the range of 0.001 to several ohms mm ($10^{-4}$ to $10^{-1}$ of ohms cm). The specific resistance is identical to volume resistivity.

CITATION LIST

Patent Literature

PTL 1: Japanese Patent No. 4123957

SUMMARY OF THE INVENTION

Patent Literature 1 states that when an electric current of 1 mA flows through the voltage nonlinear resistive element, the voltage V1mA between both ends is approximately 4 V. However, voltage in a high electric current region (for example, in the case that an electric current of 20 A/cm² flows) is not studied.

The present invention solves such problems and principally aims to lower clamping voltage in a high electric current region of a zinc oxide voltage nonlinear resistive element.

Solution to Problem

A voltage nonlinear resistive element according to the present invention includes a voltage nonlinear resistor containing at least one joined body in which a zinc oxide ceramic layer composed mainly of zinc oxide and having a volume resistivity of less than $1.0 \times 10^{-2}$ Ωcm is joined to a rare-earth metal oxide layer composed mainly of a rare-earth metal oxide, and a pair of electrodes disposed on the voltage nonlinear resistor such that an electrically conductive path passes through a junction between the zinc oxide ceramic layer and the rare-earth metal oxide layer.

In this voltage nonlinear resistive element, the zinc oxide ceramic layer of the voltage nonlinear resistor is a zinc oxide ceramic layer having a lower volume resistivity than before. Thus, the clamping voltage in a high electric current region (for example, in the case that an electric current of 20 A/cm² flows) can be lower than before. As a result, for example, even when a large current flows through a voltage nonlinear resistive element according to the present invention due to static electricity, a rise in voltage can be decreased, and the dielectric breakdown of the element can be prevented.

In a voltage nonlinear resistive element according to the present invention, the zinc oxide ceramic layer may contain one or more selected from the group consisting of $Al_2O_3$, $In_2O_3$, and $Ga_2O_3$. The addition of such a trivalent metal ion can relatively easily decrease the volume resistivity of the zinc oxide ceramic layer.

In a voltage nonlinear resistive element according to the present invention, the rare-earth metal oxide layer may be formed on the zinc oxide ceramic layer by sputtering. The rare-earth metal oxide layer can be formed by sputtering without exposing the zinc oxide ceramic layer to a high temperature. Thus, the volume resistivity of the zinc oxide ceramic layer is not increased by heat.

In a voltage nonlinear resistive element according to the present invention, the voltage nonlinear resistor may include two or more of the stacked joined bodies, and a rare-earth metal oxide layer, or a rare-earth metal oxide layer and a conductor layer, or a rare-earth metal oxide layer, a conductor layer, a rare-earth metal oxide layer are disposed between adjacent zinc oxide ceramic layers. Thus, the number of stacked joined bodies in the voltage nonlinear resistor can be adjusted for various varistor voltages.

A method for manufacturing a voltage nonlinear resistive element according to the present invention includes the steps of (a) producing a joined body by forming a rare-earth metal oxide layer composed mainly of a rare-earth metal oxide on a zinc oxide ceramic layer composed mainly of zinc oxide and having a volume resistivity of less than $1.0 \times 10^{-2}$ Ωcm by sputtering, (b) producing a layered voltage nonlinear resistor by preparing at least two of the joined bodies, stacking the joined bodies with a conductor foil interposed between the rare-earth metal oxide layer of one of the joined bodies and the zinc oxide ceramic layer of the other of the joined bodies, or directly stacking the joined bodies without anything interposed therebetween, and joining the joined bodies in this state by heat treatment in an inert atmosphere at a temperature in the range of 300° C. to 700° C., and (c) forming a pair of electrodes such that an electrically conductive path passes through a junction between the zinc oxide ceramic layer and the rare-earth metal oxide layer, or alternatively (a) producing a joined body by forming a rare-earth metal oxide layer composed mainly of a rare-earth metal oxide on a zinc oxide ceramic layer composed mainly of zinc oxide and having a volume resistivity of less than $1.0 \times 10^{-2}$ Ωcm by sputtering, (b) producing a layered voltage nonlinear resistor by preparing at least two of the joined bodies, stacking the joined bodies with a conductor foil interposed between the rare-earth metal oxide layer of one of the joined bodies and the rare-earth metal oxide layer of the other of the joined bodies, or directly stacking the joined bodies without anything interposed therebetween, and joining the joined bodies in this state by heat treatment in an inert atmosphere at a temperature in the range of 300° C. to 700° C., and (c) forming a pair of electrodes such that an electrically conductive path passes through a junction between the zinc oxide ceramic layer and the rare-earth metal oxide layer.

This method can be used to relatively easily manufacture a voltage nonlinear resistive element that includes a plurality of stacked joined bodies in a voltage nonlinear resistor. Furthermore, because the heat treatment temperature in the step (b) ranges from 300° C. to 700° C. and is relatively low, this can prevent the volume resistivity of the zinc oxide ceramic layers from being increased by heat. In particular, this effect is significant when the heat treatment temperature in the step (b) ranges from 300° C. to 500° C.

DETAILED DESCRIPTION OF THE INVENTION

Figure 1:
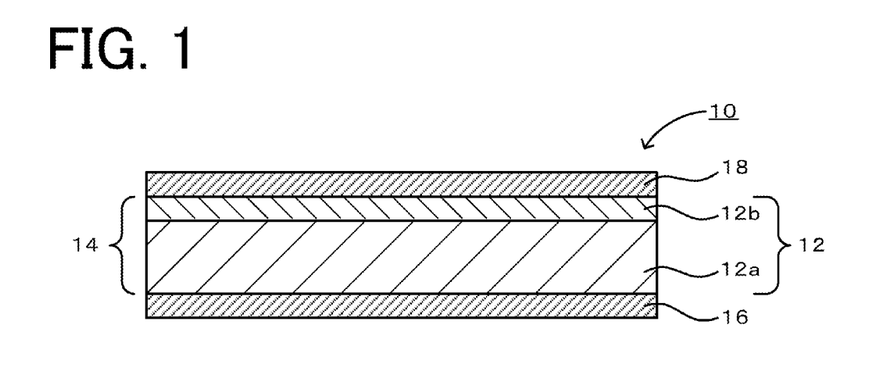
FIG. 1 is a cross-sectional view of a voltage nonlinear resistive element 10.

Preferred embodiments of the present invention will be described below with reference to the accompanying drawings. FIG. 1 is a cross-sectional view of a voltage nonlinear resistive element 10 according to the present embodiment.

The voltage nonlinear resistive element 10 includes a voltage nonlinear resistor (hereinafter abbreviated to a resistor) 14 and a pair of electrodes 16 and 18 disposed on opposite sides of the resistor 14.

The resistor 14 includes a joined body 12 in which a zinc oxide ceramic layer 12a is joined to a rare-earth metal oxide layer 12b composed mainly of a rare-earth metal oxide. The zinc oxide ceramic layer 12a is a layer composed mainly of zinc oxide and having a volume resistivity of less than $1.0 \times 10^{-2}$ Ωcm. The volume resistivity is preferably $1.0 \times 10^{-3}$ Ωcm or less. This can result in a still lower clamping voltage in a high electric current region than before. The rare-earth metal oxide layer 12b preferably has a thickness in the range of 0.01 to 1 µm, more preferably 0.05 to 0.5 µm. The rare-earth metal oxide is not particularly limited and is preferably $Pr_2O_3$, $La_2O_3$, or $Yb_2O_3$, for example.

The pair of electrodes 16 and 18 are formed on the resistor 14 such that an electrically conductive path passes through a junction between the zinc oxide ceramic layer 12a and the rare-earth metal oxide layer 12b. The electrodes 16 and 18 may be formed of any electrically conductive material that can form a satisfactory ohmic contact with the zinc oxide ceramic, for example, gold, silver, platinum, or aluminum. When a voltage is applied to the element such that the electrode 18 is an anode, an electric current can flow easily. On the other hand, when a voltage is applied to the element such that the electrode 16 is an anode, the element exhibits voltage nonlinearity.

An example of the manufacture of the voltage nonlinear resistive element 10 will be described below.

Formation of Zinc Oxide Ceramic Layer 12a

The zinc oxide ceramic layer 12a can be formed by cutting a plate material having a predetermined size from a zinc oxide ceramic block having a volume resistivity of less than $1.0 \times 10^{-2}$ Ωcm, preferably $1.0 \times 10^{-3}$ Ωcm or less. The zinc oxide ceramic block can be produced by dissolving a trivalent ion of Al, Ga, In, or the like in a zinc oxide ceramic as a dopant or by introducing an oxygen defect by firing a zinc oxide powder in a nonoxidizing atmosphere. A zinc oxide ceramic block in which a dopant is dissolved can be produced by first mixing a zinc oxide powder with an $Al_2O_3$, $Ga_2O_3$, $In_2O_3$, or another trivalent metal oxide powder such that the trivalent metal oxide constitutes 0.05% to 2.0% by mass and forming the mixed powder into a compact having a predetermined shape. The compact is then held in a nonoxidizing atmosphere (for example, a nitrogen or argon atmosphere) at a temperature in the range of 900° C. to 1200° C. for several hours and is then fired at a temperature in the range of 1300° C. to 1500° C. for several hours. In this manner, a zinc oxide ceramic block having low volume resistivity can be relatively easily produced. In order to achieve the target volume resistivity, the mass percentage of the trivalent metal oxide powder to be mixed with the zinc oxide powder or the firing temperature may be adjusted. The zinc oxide powder used as a raw material preferably has an average particle size in the range of 0.02 to 5 µm. The trivalent metal oxide powder preferably has an average particle size in the range of 0.01 to 0.5 µm. The trivalent metal oxide powder is preferably an $Al_2O_3$ powder. The $Al_2O_3$ powder may be formed of θ-alumina, γ-alumina, or boehmite. In order to produce the zinc oxide ceramic block having low volume resistivity by firing the zinc oxide powder in a nonoxidizing atmosphere, for example, the zinc oxide powder is fired in a nonoxidizing atmosphere (for example, a nitrogen or argon atmosphere) at a temperature in the range of 1300° C. to 1500° C. for several hours.

Formation of Rare-Earth Metal Oxide Layer 12b

The rare-earth metal oxide layer 12b may be formed of a rare-earth metal oxide alone or a mixture of two or more rare-earth oxides or may contain a rare-earth metal oxide as a main component and another oxide (for example, $Cr_2O_3$, MnO, Cod, ZnO, or $SiO_2$) as an accessory component. When the rare-earth metal oxide layer 12b is formed of a rare-earth metal oxide alone, for example, the rare-earth metal oxide layer 12b may be formed on the zinc oxide ceramic layer 12a by sputtering a target of the rare-earth metal oxide. Instead of sputtering, vacuum evaporation or ion plating may also be used. The rare-earth metal oxide layer 12b may also be formed by applying a paste containing a rare-earth metal oxide powder to the zinc oxide ceramic layer 12a, drying the paste, and heat-treating the dried product at a relatively low temperature (for example, in the range of 200° C. to 700° C., preferably 200° C. to 500° C.). When the rare-earth metal oxide layer 12b contains an accessory component, the rare-earth metal oxide layer 12b may be formed on the zinc oxide ceramic layer 12a by simultaneously sputtering targets of the rare-earth metal oxide and the accessory component. The rare-earth metal oxide layer 12b may also be formed by applying a paste containing a rare-earth metal oxide powder and an accessory component powder to the zinc oxide ceramic layer 12a, drying the paste, and heat-treating the dried product at a relatively low temperature. In the case of heat treatment, the volume resistivity of the zinc oxide ceramic layer 12a is less likely to be increased by heating because the temperature is relatively low. However, because sputtering can be performed at a lower temperature, sputtering can eliminate the possibility of such an increase in volume resistivity.

Formation of Electrodes 16 and 18

In the present embodiment, the resistor 14 includes one joined body 12 in which the zinc oxide ceramic layer 12a is joined to the rare-earth metal oxide layer 12b. The electrodes 16 and 18 can be formed on both sides of the resistor 14 by vapor deposition or sputtering of an electrode material. The electrode material may be gold, silver, platinum, or aluminum. Plate-shaped electrodes 16 and 18 may be joined to each surface of the resistor 14 with an electrically conductive joint member.

When a voltage is applied to the voltage nonlinear resistive element 10 described above in detail such that the electrode 16 is an anode, the voltage nonlinear resistive element 10 exhibits voltage nonlinearity. Thus, the clamping voltage in a high electric current region (for example, in the case that an electric current of 20 A/cm$^2$ flows) can be lower than before. As a result, for example, even when a large current flows through the voltage nonlinear resistive element 10 due to static electricity, a rise in voltage can be decreased, and the dielectric breakdown of the element can be prevented.

The present invention should not be limited to the embodiments described above and can be implemented in various aspects within the scope of the present invention.

For example, although the voltage nonlinear resistive element 10 includes the electrodes 16 and 18 on both sides of the resistor 14 containing one joined body 12, the resistor 14 may be replaced with a layered resistor composed of a plurality of joined bodies 12. Such a layered resistor can be used to control the varistor voltage. Thus, it is possible to manufacture a voltage nonlinear resistive element that has a varistor voltage suitable for the intended application. Examples that include a layered resistor are illustrated in FIGS. 2 to 5.

Figure 2:
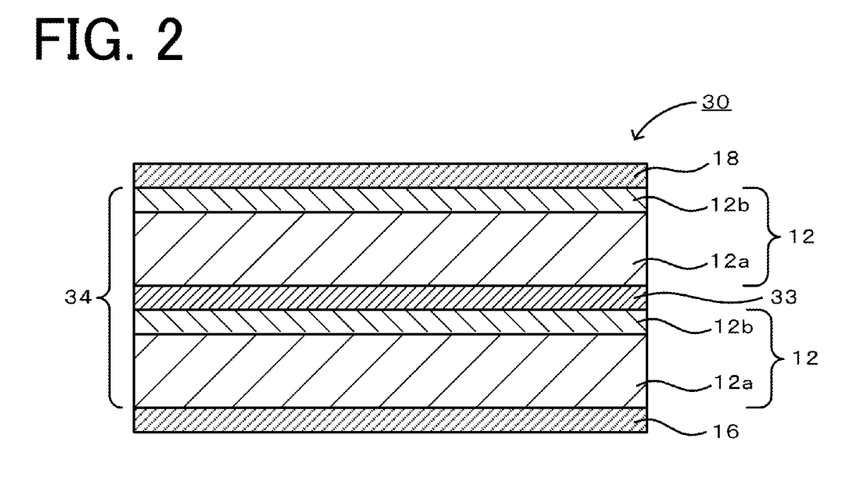
FIG. 2 is a cross-sectional view of a voltage nonlinear resistive element 30.

A voltage nonlinear resistive element 30 illustrated in FIG. 2 includes a layered resistor 34 and electrodes 16 and 18 disposed on both sides of the layered resistor 34. The layered resistor 34 includes two joined bodies 12 stacked with a conductor layer 33 interposed therebetween. In the resistor 34, a rare-earth metal oxide layer 12*b* and the conductor layer 33 are disposed between adjacent zinc oxide ceramic layers 12*a*. The resistor 34 can be manufactured as described below. First, two joined bodies 12 are prepared. A zinc oxide ceramic layer 12*a* of one of the joined bodies 12 is brought into contact with a rare-earth metal oxide layer 12*b* of the other of the joined bodies 12 with a brazing filler (for example, Au—Ge alloy foil, Au—Sn alloy foil, or Au—Si alloy foil), which is a conductor foil, interposed therebetween. These are pressed into a single piece. The piece is heated at a predetermined joining temperature (for example, 300° C. to 700° C., preferably 300° C. to 500° C.) in an inert atmosphere for a predetermined time and is then cooled. This allows the brazing filler to be melted or softened and then solidified and form the conductor layer 33, thus constituting the resistor 34. The voltage nonlinear resistive element 30 has the same advantages as the element 10. Because the layered resistor 34 includes the two joined bodies 12, the clamping voltage can be approximately twice the clamping voltage of the voltage nonlinear resistive element 10 according to Example 1. Furthermore, when the resistance of the zinc oxide ceramic layers 12*a* is decreased by adding a large amount of dopant (trivalent ion) to a zinc oxide ceramic or by forming a large number of oxygen deficiencies by heat treatment in an inert atmosphere, an excessively high joining temperature (for example, 900° C. or 1000° C.) sometimes results in high resistance due to precipitation of the dopant or elimination of the oxygen deficiencies. In this embodiment, however, because the joining temperature is 700° C. or less, preferably 500° C. or less, the zinc oxide ceramic layers 12*a* can have consistently low resistance.

Figure 3:
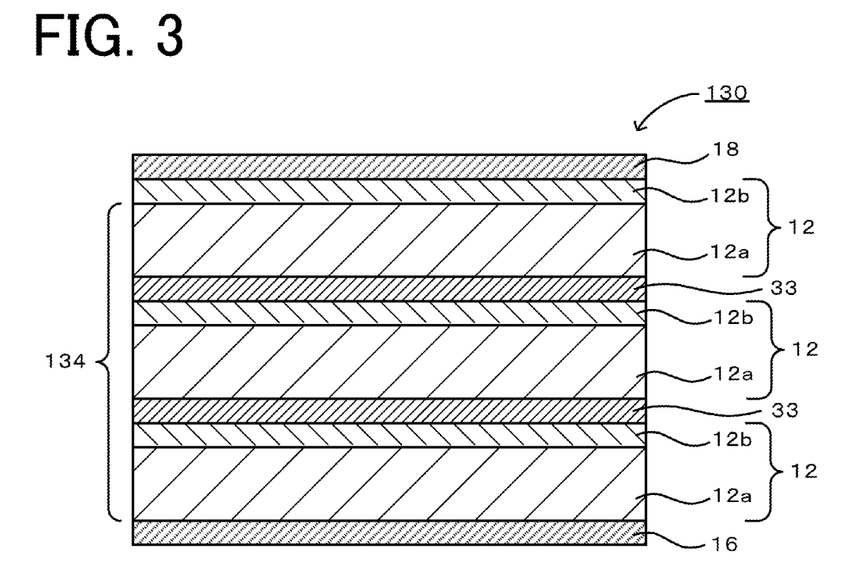
FIG. 3 is a cross-sectional view of a voltage nonlinear resistive element 130.

A voltage nonlinear resistive element 130 illustrated in FIG. 3 includes a layered resistor 134 and electrodes 16 and 18 disposed on both sides of the layered resistor 134. The layered resistor 134 includes three joined bodies 12 stacked with a conductor layer 33 interposed therebetween. In the resistor 134, a rare-earth metal oxide layer 12*b* and the conductor layer 33 are disposed between adjacent zinc oxide ceramic layers 12*a*. The voltage nonlinear resistive element 130 has the same basic structure and advantages as the voltage nonlinear resistive element 30 illustrated in FIG. 2 and is therefore not described in detail. Because the layered resistor 134 in the element 130 includes the three joined bodies 12, the clamping voltage can be approximately three times the clamping voltage of the voltage nonlinear resistive element 10 according to Example 1.

Figure 4:
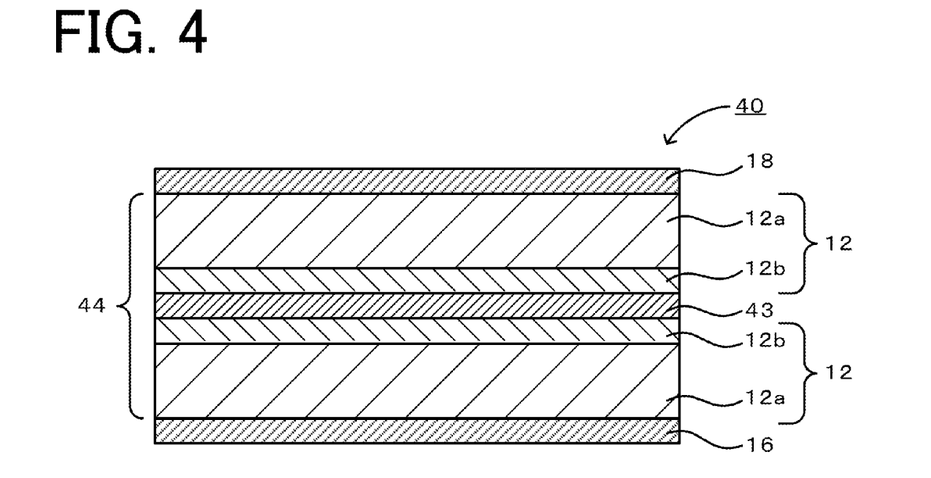
FIG. 4 is a cross-sectional view of a voltage nonlinear resistive element 40.

A voltage nonlinear resistive element 40 illustrated in FIG. 4 includes a layered resistor 44 and electrodes 16 and 18 disposed on both sides of the layered resistor 44. The layered resistor 44 includes two joined bodies 12 stacked with a conductor layer 43 interposed therebetween. In the resistor 44, a rare-earth metal oxide layer 12*b*, the conductor layer 43, and another rare-earth metal oxide layer 12*b* are disposed between adjacent zinc oxide ceramic layers 12*a*. The resistor 44 can be manufactured as described below. First, two joined bodies 12 are prepared. A rare-earth metal oxide layer 12*b* of one of the joined bodies 12 is brought into contact with a rare-earth metal oxide layer 12*b* of the other of the joined bodies 12 with the brazing filler interposed therebetween. These are pressed into a single piece. In the same manner as in the voltage nonlinear resistive element 30, heat treatment in an inert atmosphere allows the brazing filler to be melted or softened and then solidified and form the conductor layer 43, thus constituting the resistor 44. When a voltage is applied to the voltage nonlinear resistive element 40 such that the electrode 16 or the electrode 18 is an anode, the voltage nonlinear resistive element 40 exhibits voltage nonlinearity. The clamping voltage of the voltage nonlinear resistive element 40 is almost the same as the clamping voltage of the voltage nonlinear resistive element 10 according to Example 1. Furthermore, for the reason described above for the voltage nonlinear resistive element 30, the zinc oxide ceramic layers 12*a* can have consistently low resistance.

Figure 5:
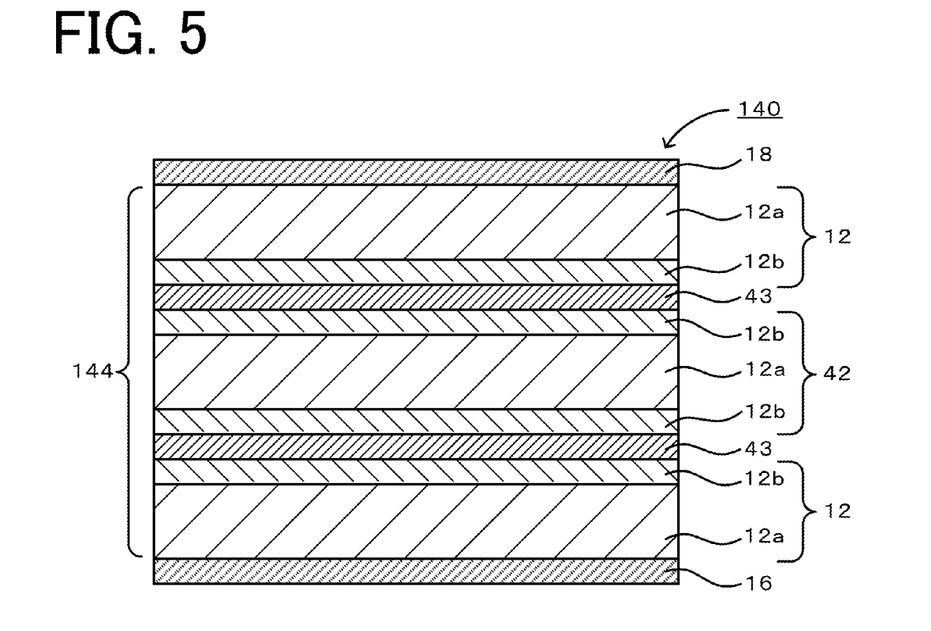
FIG. 5 is a cross-sectional view of a voltage nonlinear resistive element 140.

A voltage nonlinear resistive element 140 illustrated in FIG. 5 includes a layered resistor 144 and electrodes 16 and 18 disposed on both sides of the layered resistor 144. The layered resistor 144 includes two joined bodies 12 and one joined body 42 having a three-layer structure stacked with a conductor layer 43 interposed therebetween. In the resistor 144, a rare-earth metal oxide layer 12*b*, the conductor layer 43, and another rare-earth metal oxide layer 12*b* are disposed between adjacent zinc oxide ceramic layers 12*a*. The resistor 144 can be manufactured as described below. First, two joined bodies 12 are prepared. A zinc oxide ceramic layer 12*a* is overlaid with a rare-earth metal oxide layer 12*b* on both sides thereof, thereby producing the joined body 42 having the three-layer structure. A rare-earth metal oxide layer 12*b* of one of the joined bodies 12 is brought into contact with one of the rare-earth metal oxide layers 12*b* of the joined body 42 having the three-layer structure with the brazing filler interposed therebetween. The other of the rare-earth metal oxide layers 12*b* of the joined body 42 having the three-layer structure is brought into contact with a rare-earth metal oxide layer 12*b* of the other of the joined bodies 12 with the brazing filler interposed therebetween. These are pressed into a single piece. In the same manner as in the voltage nonlinear resistive element 30, heat treatment in an inert atmosphere allows the brazing filler to be melted or softened and then solidified and form the conductor layer 43, thus constituting the resistor 144. When a voltage is applied to the voltage nonlinear resistive element 140 such that the electrode 16 or the electrode 18 is an anode, the voltage nonlinear resistive element 140 exhibits voltage nonlinearity. The clamping voltage of the voltage nonlinear resistive element 140 is approximately twice the clamping voltage of the voltage nonlinear resistive element 10 according to Example 1.

Although a plurality of joined bodies 12 in the embodiments illustrated in FIGS. 2 to 5 are joined with the conductor layer 33 or 43 interposed therebetween, the joined bodies 12 may be directly joined without the brazing filler. Also in such a case, the joined bodies 12 are preferably joined at a relatively low temperature (for example, 300° C. to 700° C., preferably 300° C. to 500° C.).

EXAMPLES

Example 1

Zinc oxide (average particle size 1.5 μm) was added to 0.1% by mass of θ-alumina (average particle size 0.02 μm), the mixture was wet-blended, was dried, was passed through a sifter having a sieve opening of 75 μm, and was shaped to form a compact. The compact was degreased and held in a $N_2$ atmosphere at 1100° C. for 5 hours and was then fired at 1400° C. for 5 hours, thereby producing a zinc oxide ceramic block. The zinc oxide ceramic block had a volume resistivity of $9.0 \times 10^{-3}$ am. A 10 mm×10 mm×1 mm zinc oxide ceramic sheet was cut from the zinc oxide ceramic block. After the sheet was polished and washed, a sputtered praseodymium oxide film (thickness 0.3 μm) was formed on the zinc oxide ceramic sheet by high-frequency plasma sputtering a target of praseodymium oxide ($Pr_2O_3$), thereby producing a joined body. RFS-200 manufactured by ULVAC KIKO, Inc. was used for sputtering. The deposition conditions were as follows: target size: 80 mm in diameter, RF output: 20 W, gas pressure (Ar): 2.0 Pa, deposition time: 15 minutes.

Figure 6:
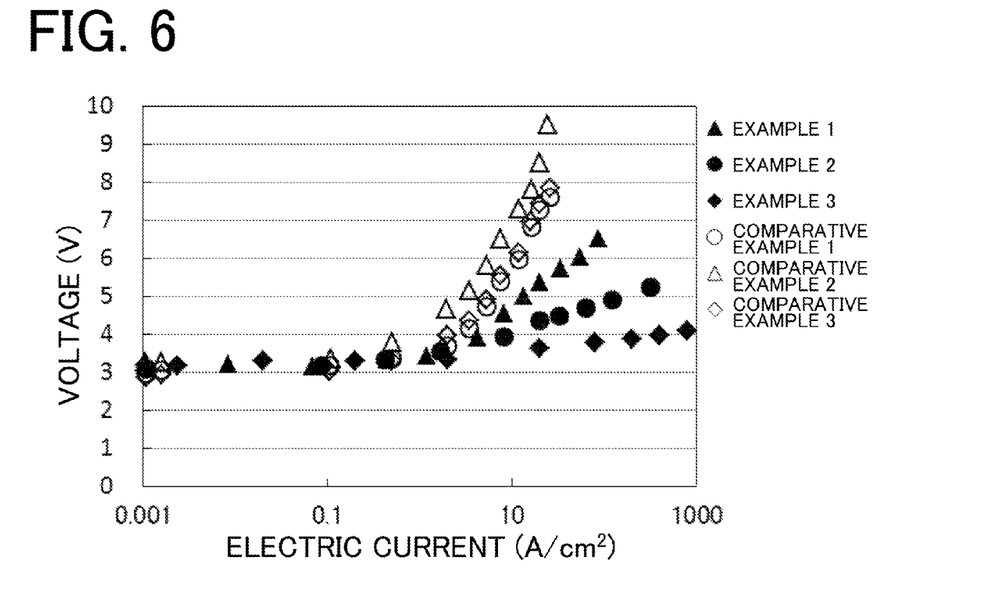
FIG. 6 is a graph of the electric current-voltage characteristics of voltage nonlinear resistive elements according to Examples 1 to 3 and Comparative Example 1 to 3.

The joined body was directly used as a resistor. An Al vapor deposition electrode was formed on both sides of the resistor. Thus, a voltage nonlinear resistive element was manufactured (see FIG. 1). Electric current-voltage characteristics were measured by applying a voltage between the electrodes of the voltage nonlinear resistive element. The electrode on the zinc oxide ceramic sheet was an anode, and the electrode on the praseodymium oxide sputtered film was a cathode. Table 1 and FIG. 6 show the results. The clamping voltage at an electric current corresponding to 1 mA/cm$^2$ was 3.2 V, and the clamping voltage at an electric current corresponding to 20 A/cm$^2$ was 5.4 V.

Example 2

A zinc oxide ceramic block was produced in the same manner as in Example 1 except that zinc oxide was mixed with 1% by mass θ-alumina. The zinc oxide ceramic block had a volume resistivity of $9.3 \times 10^{-4}$ Ωcm. A 10 mm×10 mm×1 mm zinc oxide ceramic sheet was cut from the zinc oxide ceramic block. The sheet is used to produce a joined body in the same manner as in Example 1. The joined body was directly used as a resistor. An Al vapor deposition electrode was formed on both sides of the resistor. Thus, a voltage nonlinear resistive element was manufactured. Electric current-voltage characteristics were measured by applying a voltage between the electrodes of the voltage nonlinear resistive element in the same manner as in Example 1. Table 1 and FIG. 6 show the results. The clamping voltage at an electric current corresponding to 1 mA/cm$^2$ was 3.1 V, and the clamping voltage at an electric current corresponding to 20 A/cm$^2$ was 4.4 V.

Example 3

A zinc oxide ceramic block was produced in the same manner as in Example 1 except that zinc oxide was mixed with 2% by mass θ-alumina. The zinc oxide ceramic block had a volume resistivity of $1.1 \times 10^{-4}$ am. A 10 mm×10 mm×1 mm zinc oxide ceramic sheet was cut from the zinc oxide ceramic block. The sheet is used to produce a joined body in the same manner as in Example 1. The joined body was directly used as a resistor. An Al vapor deposition electrode was formed on both sides of the resistor. Thus, a voltage nonlinear resistive element was manufactured. Electric current-voltage characteristics were measured by applying a voltage between the electrodes of the voltage nonlinear resistive element in the same manner as in Example 1. Table 1 and FIG. 6 show the results. The clamping voltage at an electric current corresponding to 1 mA/cm$^2$ was 3.2 V, and the clamping voltage at an electric current corresponding to 20 A/cm$^2$ was 3.6 V.

Comparative Example 1

Aqueous aluminum nitrate was added to zinc oxide. The amount of aluminum nitrate was 0.01% by mass on an $Al_2O_3$ basis. The water content of the product was adjusted to be 50% by mass by the addition of water. Minute amounts of binder and antifoaming agent were added to the product. The product was agitated by ultrasonic waves for 30 minutes and with an impeller blade for 30 minutes. After agitation, the product was granulated using a spray dryer to produce a granulated powder. The granulated powder was passed through a sifter having a sieve opening of 200 μm, was shaped, was degreased, and was fired in the air at 1400° C.

TABLE 1

| | Examples | | | Comparative Examples | | |
|---|---|---|---|---|---|---|
| | 1 | 2 | 3 | 1 | 2 | 3 |
| | volume resistivity of zinc oxide ceramic layer (Ωcm) | | | | | |
| | $9.0 \times 10^{-3}$ | $9.3 \times 10^{-4}$ | $1.1 \times 10^{-4}$ | $2.0 \times 10^{-2}$ | $7.3 \times 10^{-1}$ | $3.5 \times 10^{-2}$ |
| $V_{1\ mA/cm2}$ (V) [*1] | 3.2 | 3.1 | 3.2 | 2.9 | 3.3 | 2.9 |
| $V_{20\ A/cm2}$ (V) [*2] | 5.4 | 4.4 | 3.6 | 7.3 | 8.5 | 7.4 |

[*1] clamping voltage at an electric current corresponding to 1 mA/cm$^2$
[*2] clamping voltage at an electric current corresponding to 20 A/cm$^2$ for 5 hours, thereby producing a zinc oxide ceramic block. The zinc oxide ceramic block had a volume resistivity of $2.0\times10^{-2}$ Ωcm. A 10 mm×10 mm×1 mm zinc oxide ceramic sheet was cut from the zinc oxide ceramic block. A sputtered rare-earth metal oxide film was formed on the zinc oxide ceramic sheet in the same manner as in Example 1, thereby producing a joined body. The joined body was directly used as a resistor. An Al vapor deposition electrode was formed on both sides of the resistor. Thus, a voltage nonlinear resistive element was manufactured. Electric current-voltage characteristics were measured by applying a voltage between the electrodes of the voltage nonlinear resistive element in the same manner as in Example 1. Table 1 and FIG. 6 show the results. The clamping voltage at an electric current corresponding to 1 mA/cm² was 2.9 V, and the clamping voltage at an electric current corresponding to 20 A/cm² was 7.3 V.

Comparative Example 2

Comparative Example 2 is an example in which a zinc oxide compact was fired in an air (in Example 1 and 2, the compact was fired in a $N_2$ atmosphere). Zinc oxide was added to 0.1% by mass of θ-alumina, the mixture was wet-blended and dried. After heat-treating at a temperature of 1000° C., the calcined mixture was ground in a ball mill until the particle size of it becomes 1 μm or less. Zinc oxide and θ-alumina are the same one as used in Example 1. The ground product was dried, was passed through a sifter having a sieve opening of 75 μm, and was shaped to form a compact. The compact was degreased and fired in an air at 1300° C. for 5 hours, thereby producing a zinc oxide ceramic block. The zinc oxide ceramic block had a volume resistivity of $7.3\times10^{-1}$ Ωcm. A 10 mm×10 mm×1 mm zinc oxide ceramic sheet was cut from the zinc oxide ceramic block. A sputtered rare-earth metal oxide film (praseodymium oxide) was formed on the zinc oxide ceramic sheet in the same manner as in Example 1, thereby producing a joined body. The joined body was directly used as a resistor. An Al vapor deposition electrode was formed on both sides of the resistor. Thus, a voltage nonlinear resistive element was manufactured. Electric current-voltage characteristics were measured by applying a voltage between the electrodes of the voltage nonlinear resistive element in the same manner as in Example 1. Table 1 and FIG. 6 show the results. The clamping voltage at an electric current corresponding to 1 mA/cm² was 3.3 V, and the clamping voltage at an electric current corresponding to 20 A/cm² was 8.5 V.

Comparative Example 3

A zinc oxide ceramic block was produced in the same manner as in Comparative Example 2 except that zinc oxide was mixed with 1% by mass θ-alumina. The zinc oxide ceramic block had a volume resistivity of $3.5\times10^{-2}$ Ωcm. A 10 mm×10 mm×1 mm zinc oxide ceramic sheet was cut from the zinc oxide ceramic block. A sputtered rare-earth metal oxide film (praseodymium oxide) was formed on the zinc oxide ceramic sheet in the same manner as in Example 1, thereby producing a joined body. The joined body was directly used as a resistor. An Al vapor deposition electrode was formed on both sides of the resistor. Thus, a voltage nonlinear resistive element was manufactured. Electric current-voltage characteristics were measured by applying a voltage between the electrodes of the voltage nonlinear resistive element in the same manner as in Example 1. Table 1 and FIG. 6 show the results. The clamping voltage at an electric current corresponding to 1 mA/cm² was 2.9 V, and the clamping voltage at an electric current corresponding to 20 A/cm² was 7.4 V.

Voltage generated in a high electric current region (for example, a region of 20 A/cm² or more) was lower in the voltage nonlinear resistive elements according to Examples 1 to 3, which included the zinc oxide ceramic sheet having a volume resistivity of less than $1.0\times10^{-2}$ Ωcm (particularly $1.0\times10^{-3}$ Ωcm or less), than in the voltage nonlinear resistive element according to Comparative Example 1 to 3, which included the zinc oxide ceramic sheet having a volume resistivity of $2.0\times10^{-2}$ Ωcm or more and being fired in an air. Thus, the voltage nonlinear resistive elements according to Examples 1 to 3 had an improved electronic circuit protective function.

Example 4

Two joined bodies were prepared in the same manner as in Example 3. A zinc oxide ceramic sheet of one of the joined bodies was brought into contact with a sputtered praseodymium oxide film of the other of the joined bodies with a Au—Ge alloy (the mass ratio of Au/Ge=88/12) foil (thickness 50 μm) interposed therebetween. The joined bodies in this state were joined by heat treatment in an inert atmosphere at 420° C. for 10 minutes, thereby producing a layered resistor. An Al vapor deposition electrode was formed on both sides of the resistor. Thus, a voltage nonlinear resistive element was manufactured (see FIG. 2). Electric current-voltage characteristics were measured by applying a voltage between the electrodes of the voltage nonlinear resistive element. The electrode on the zinc oxide ceramic sheet was an anode, and the electrode on the sputtered film was a cathode. As a result, although not shown in the figure, the voltage nonlinear resistive element had the voltage nonlinear resistance characteristics similar to that in Example 3. The clamping voltage in a nonlinearity region (a region having an electric current in the range of 0.01 to 2 A/cm²) in this case was approximately twice the clamping voltage in Example 3.

These examples are only examples of the present invention and do not limit the present invention.

The present application claims priority from Japanese Patent Application No. 2014-056498 filed on Mar. 19, 2014, the entire contents of which are incorporated herein by reference.

INDUSTRIAL APPLICABILITY

The voltage nonlinear resistive element of the present invention is applicable to elements for protecting electronic circuits from abnormal voltage, specifically used for various sensors, such as humidity sensors and temperature sensors.

What is claimed is:

1. A voltage nonlinear resistive element including:
   a voltage nonlinear resistor containing at least two joined bodies in each of which a zinc oxide ceramic layer composed mainly of zinc oxide and having a volume resistivity of less than $1.0\times10^{-2}$ Ωcm is joined to a rare-earth metal oxide layer composed mainly of a rare-earth metal oxide, and
   a pair of electrodes disposed on the voltage nonlinear resistor such that an electrically conductive path passes through a junction between the zinc oxide ceramic layer and the rare-earth metal oxide layer,
   wherein (i) a rare-earth metal oxide layer and a conductor layer, or (ii) a rare-earth metal oxide layer, a conductor layer and a rare-earth metal oxide layer are disposed between adjacent zinc oxide ceramic layers.

2. The voltage nonlinear resistive element according to claim 1, wherein the zinc oxide ceramic layer contains one or more selected from the group consisting of $Al_2O_3$, $In_2O_3$, and $Ga_2O_3$.

3. The voltage nonlinear resistive element according to claim 1, wherein the rare-earth metal oxide layer is formed on the zinc oxide ceramic layer by sputtering.

4. A method for manufacturing a voltage nonlinear resistive element including the steps of;
(a) producing a joined body by forming a rare-earth metal oxide layer composed mainly of a rare-earth metal oxide on a zinc oxide ceramic layer composed mainly of zinc oxide and having a volume resistivity of less than $1.0 \times 10^{-2}$ Ωcm by sputtering,
(b) producing a layered voltage nonlinear resistor by preparing at least two of the joined bodies, stacking the joined bodies with a conductor foil interposed between the rare-earth metal oxide layer of one of the joined bodies and the rare-earth metal oxide layer of the other of the joined bodies, or directly stacking the joined bodies without anything interposed therebetween, and joining the joined bodies in this state by heat treatment in an inert atmosphere at a temperature in the range of 300° C. to 700° C., and
(c) forming a pair of electrodes such that an electrically conductive path passes through a junction between the zinc oxide ceramic layer and the rare-earth metal oxide layer.

5. A method for manufacturing a voltage nonlinear resistive element including the steps of;
(a) producing a joined body by forming a rare-earth metal oxide layer composed mainly of a rare-earth metal oxide on a zinc oxide ceramic layer composed mainly of zinc oxide and having a volume resistivity of less than $1.0 \times 10^{-2}$ Ωcm by sputtering,
(b) producing a layered voltage nonlinear resistor by preparing at least two of the joined bodies, stacking the joined bodies with a conductor foil interposed between the rare-earth metal oxide layer of one of the joined bodies and the zinc oxide ceramic layer of the other of the joined bodies, or directly stacking the joined bodies without anything interposed therebetween, and joining the joined bodies in this state by heat treatment in an inert atmosphere at a temperature in the range of 300° C. to 700° C., and
(c) forming a pair of electrodes such that an electrically conductive path passes through a junction between the zinc oxide ceramic layer and the rare-earth metal oxide layer.

6. The method for manufacturing the voltage nonlinear resistive element according to claim 4, wherein the heat treatment in the step (b) is performed at a temperature in the range of 300° C. to 500° C.

7. The method for manufacturing the voltage nonlinear resistive element according to claim 5, wherein the heat treatment in the step (b) is performed at a temperature in the range of 300° C. to 500° C.

* * * * *